(No Model.)

T. TANNER.
WINDOW GLASS FASTENER.

No. 252,707. Patented Jan. 24, 1882.

WITNESSES:

INVENTOR:
T. Tanner
BY
ATTORNEYS.

UNITED STATES PATENT OFFICE.

THEOPHILUS TANNER, OF OSAGE, NEBRASKA.

WINDOW-GLASS FASTENER.

SPECIFICATION forming part of Letters Patent No. 252,707, dated January 24, 1882.

Application filed June 23, 1881. (No model.)

*To all whom it may concern:*

Be it known that I, THEOPHILUS TANNER, of Osage, in the county of Otoe and State of Nebraska, have invented a new and Improved Window-Light Fastener, of which the following is a specification.

My invention consists of a rubber strip for holding and fastening window-glass in the sash, and formed substantially as hereinafter described.

Figure 1:
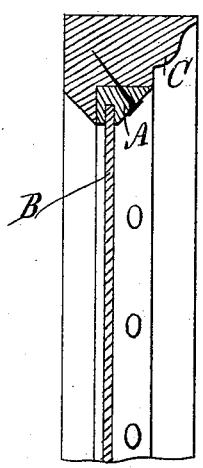
Figure 1:
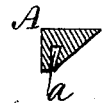
Figure 2:
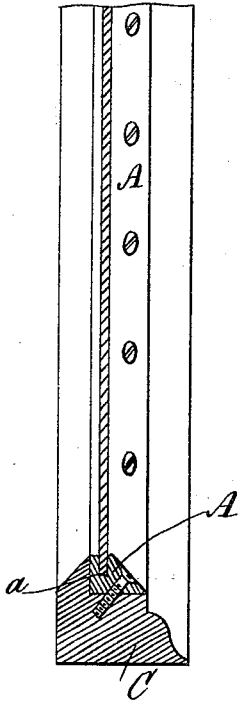

In the accompanying drawings, Figure 1 is a section of a window, showing my invention as it appears when applied for holding the glass; and Fig. 2 is a cross-section of a strip of rubber as I prefer to make it.

Similar letters of reference indicate corresponding parts.

A represents the strips of rubber, which are placed upon the glass B, and secured to the sash C by nails or screws, as shown in Fig. 1. These strips are preferably of soft rubber, and they may be made of any convenient length, which may be cut into short lengths as used to suit the size of glass to be put in. The strips are made triangular in cross-section, so as to fit closely in the corner of the sash. In the upper side of the strip, and parallel with the vertical side thereof, is formed the groove $a$, which is narrower at the top than at the bottom, so that a water-tight joint will be formed between the rubber and the glass on the outside of the window.

By the use of this fastener the panes of glass are held water and air tight in the sash, and they are not liable to get loose and rattle, and are not so easily broken as when put in with putty, and the panes can be easily and quickly put in the sash, and can be put in by anybody.

I am aware that it is not broadly new to fasten window-glass to the sash with rubber strips.

I am also aware that an elastic packing has been placed around the edge of the glass before securing it in a rabbet of the sash; and I am aware, too, that grooved rubber sashes are old; but

What I claim, and desire to secure by Letters Patent, is—

As an article of manufacture, a fastener for window-glass, consisting of the rubber strip A, triangular in cross-section, and provided with the groove $a$, narrower at the top than the bottom, to receive and hold the edge of the glass, substantially as and for the purpose set forth.

THEOPHILUS TANNER.

Witnesses:
 WILLIAM TANGEMAN,
 DIRK H. DOEDEN.